United States Patent [19]

Quayle et al.

[11] Patent Number: 5,768,939
[45] Date of Patent: Jun. 23, 1998

[54] METHOD AND APPARATUS FOR ACOUSTIC LEVEL MEASUREMENTS

[75] Inventors: Randall G. Quayle, Duvall; James R. Pottebaum, Woodinville, both of Wash.

[73] Assignee: Kistler-Morse Corporation, Bothell, Wash.

[21] Appl. No.: 659,707

[22] Filed: Jun. 10, 1996

[51] Int. Cl.$^6$ .................................................. G01F 23/28
[52] U.S. Cl. .......................................................... 73/290 V
[58] Field of Search ............................. 73/290 V, 290 R; 367/908

[56] References Cited

U.S. PATENT DOCUMENTS

| | | | |
|---|---|---|---|
| 4,579,997 | 4/1986 | Soltz | 73/290 V |
| 4,596,144 | 6/1986 | Panton et al. | 73/290 |
| 4,785,664 | 11/1988 | Reebs | 73/290 |
| 4,821,569 | 4/1989 | Soltz | 73/290 V |
| 4,992,998 | 2/1991 | Woodward | 73/290 |
| 5,163,323 | 11/1992 | Davidson | 73/290 V |
| 5,323,361 | 6/1994 | Elle et al. | 367/908 |
| 5,400,376 | 3/1995 | Trudeau | 73/290 V |
| 5,587,969 | 12/1996 | Kroemer et al. | 367/908 |

*Primary Examiner*—George M. Dombroske
*Assistant Examiner*—Ronald L. Biegel
*Attorney, Agent, or Firm*—Seed and Berry LLP

[57] ABSTRACT

An acoustic ranging system monitors the level of material inside one or more vessels. The system includes an ultrasound transducer mounted in each vessel that is connected to a transmitter and a receiver through a transmit/receive isolation switch and a multiplexer. The transmitter applies a transmit signal to the transducer responsive to a trigger signal generated by a processor thereby causing the transducer to generate an ultrasound signal. An electronic receiver coupled to the transducer generates a receive signal responsive to the reflections of the ultrasound signal from the material. The receive signal is coupled to the processor which determines the elapsed time interval between generating the trigger signal an receipt of each receive signal. The processor then converts one of the elapsed time intervals into a distance indication corresponding to the level of the surface of the material. The transmitter includes a variable frequency oscillator, and the receiver includes a programmable bandpass filter, both of which are set to the operating frequency of the transducer.

The processor controls the duration and repetition rate of the trigger signals as a function of the elapsed time intervals to maximize the rate at which the material level is determined. The system also compensates for an exponentially decaying "ringdown" signal that is generated in the transducer immediately following the generation of the ultrasound signal, and it performs a number of functions to make the system less sensitive to noise, interference, and spurious reflection problems.

28 Claims, 11 Drawing Sheets

METHOD AND APPARATUS FOR ACOUSTIC LEVEL MEASUREMENTS

TECHNICAL FIELD

This invention relates to an apparatus for measuring the level of materials, liquid or solid, by ultrasonic means, in environments where significant levels of acoustic noise may be present.

BACKGROUND ART

Typically, an ultrasound level measuring apparatus is connected through a cable to one or more ultrasonic transducers mounted at the top of respective storage tanks or containers. Each ultrasound transducer transmits ultrasonic pulses toward the surface of material in the storage tank or container and receives the resulting echoes reflected from the surface of the material. An ultrasound system of this nature is described in U.S. Pat. No. 2,943,296 to Fryklund. The electronic processing apparatus described in the Fryklund patent measures the elapsed time interval between each transmitted pulse and its echo, and converts this information into an indication of the material level.

In practice, problems are encountered when high noise levels are present in the operating environment, when multiple echoes are created by reverberations within the storage container, and when the material surface has a low reflection coefficient which reduces the intensity of the returned echoes. For example, variations in echo stability created by air turbulence, irregular material surface, or other influences will tend to produce jitter, or fluctuations, in the material level information provided by the apparatus. In the prior art, the common way to deal with this problem is to process a number of successive echoes, sum their values, and compute the average. Because erroneous data can be included in this average, this approach can result in substantial inaccuracies.

Problems can also be caused by the manner in which the transducers are mounted in storage vessels or containers. More specifically, transducers are sometimes mounted in standpipes, either as a result of these standpipes being part of the vessel top and providing the means for accessing the interior of the vessel, or specifically included to raise the transducer above the vessel top to facilitate the filling of the vessel to the maximum level without incurring loss of level control. These pipes can create resonances and end effects which further limit the minimum range of the system, i.e., the maximum level of material that can be measured. Furthermore, in certain applications, the presence of ledges, wall-mounted ladders, structural beams, etc., may interfere with the ability of conventional ultrasonic level monitoring systems to track material levels located below these objects. Such systems tend to lock onto the closest object in the path of the ultrasonic beam as a result of the strong echo created by that object. This situation may be found in municipal wastewater monitoring applications, for example, and in mining installations.

Various signal processing techniques have been applied to ultrasonic level measurement systems in order to enhance the ability of these prior art systems to discriminate between true target echoes and false reflections and other background noise. However, none of these techniques have adequately solved all of the problems, some of which are described below.

Ultrasonic level measurement technology also imposes considerable demands on the efficiency achieved in the conversion of electrical signals into acoustic energy, and acoustic energy into electrical signals, in order to achieve a maximum signal-to-noise ratio. Most of the energy contained in the transmitted burst is dispersed in the storage vessel or container. For example, turbulence and noise created by material falling in proximity to the ultrasonic beam while the storage vessel or container is being filled will greatly reduce the magnitude of the acoustic energy reflected back to the transducer. A sloped or cone-shaped material surface will not return as intense an echo as a flat, level surface will, and some particle sizes relative to the wavelength of the transducer frequency can disperse the energy instead of directing it back toward the transducer. Under these circumstances, a miniscule amount of the transmitted energy may be reflected back to the transducer.

The amount of electrical energy reaching the receiver circuitry connected to the transducer is further reduced by attenuation in the cable connecting the transducer to the receiver circuitry. The physical separation between the receiver circuitry and transducer may be in excess of several hundred feet, requiring long connecting cables which present a considerable amount of cable capacitance. In prior art systems, the small charge created by the transducer in response to an echo must be converted into a voltage in order to be amplified to a detectable level. This voltage must first charge the cable capacitance which effectively absorbs part of the signal. This phenomena, plus the resistive component of the cable, significantly reduces the signal amplitude. As a result of these long cable runs, the return echo may be attenuated to a level which may be difficult for the receiver circuitry to reliably detect, especially if some of the previously described adverse conditions are also present.

As a result of these problems, the length of the interconnecting cable that can be used in prior art systems, and thus the separation distance that can be practically used, is very limited, especially if the material being monitored has a low reflection coefficient. In an attempt to allow the transducer to output signals having sufficient energy to reach relatively long distances, larger, more powerful transducers capable of producing ultrasonic pulses containing sufficient energy to maintain a usable signal/noise ratio under adverse conditions have been employed. However, the greater oscillating mass of these transducers tends to extend the ringdown time (transducer recovery time) which immediately follows the transmit signal. During this ringdown time, the receiver circuitry may be unable to detect the echo, which, together with the duration of the transmitted signal burst, determines the minimum range at which the system can operate. The shorter this range can be made, the higher the vessel or container being monitored can be filled with material without loss of level indication by the ultrasonic apparatus.

One method that has been employed to address this problem is described in U.S. Pat. No. 4,000,650 to Snyder. The Snyder patent describes a system that uses a dual range approach whereby the transmit signal is a burst that switches between two milliseconds and ten milliseconds in duration, depending on the systems ability to acquire the target. Typically, the echo would be expected to increase in intensity as the material surface approaches the transducer, allowing the system to operate in the short burst mode which reduces the minimum tracking range. The Snyder system uses digital signal enhancement techniques to improve its ability to distinguish between wanted echoes and undesirable multiple signal reflections and other background noise. Similarly, a system described in U.S. Pat. No. 4,596,144 to Panton et al. digitizes the return signals and creates a database of samples representing the echo profile. The echo profile is then analyzed to ascertain which echo has the highest probability of representing the actual material level.

Another problem with conventional acoustic ranging systems are time inefficiencies resulting from relatively large elapsed times between successive transmissions. Sufficient time must be allotted between transmissions to allow a transmitted pulse to propagate to the bottom of a storage vessel or container, and its return echo to propagate back to the transducer. However, when the vessel or container is substantially full, this relatively long time delay is not needed since the distance between the transducer and the material level is significantly shorter when the vessel or container is full. For example, an acoustic ranging system monitoring empty 200 foot containers would require 356 ms. between transmissions because the round trip time of sound to travel 200 feet is 356 ms. Yet, when the vessel is full to within 20 feet of the transducer, it would require only 35.6 ms for the sound to travel the 20 feet round trip. By using a constant transmission rate, the remaining time of 320.4 ms is wasted and thus reduces the efficiency of the system since level information updates cannot be obtained at the optimum rate.

The various techniques employed in the prior art have materially improved the performance of ultrasonic level measurement systems, but none have been able to completely overcome all the problems that are encountered in the wide range of possible applications.

SUMMARY OF THE INVENTION

The inventive acoustic ranging system monitors the level of material inside a vessel using an ultrasound transducer mounted in the vessel at a position and orientation adapted to direct an ultrasound signal toward, and receive reflections of the ultrasound signal from, the surface of the material. The system includes an ultrasound transmitter coupled to the transducer to apply a transmit signal to the transducer responsive to a trigger signal thereby causing the transducer to generate the ultrasound signal. An electronic receiver coupled to the transducer generates a receive signal responsive to the reflections of the ultrasound signal from the surface of the material. The receive signal is applied to a signal detector which generates a processor interrupt corresponding to the reflections. A processor is coupled to the transmitter to generate the trigger signal to cause the transmitter to generate the transmit signal. The processor also receives the signals from the signal detector to identify the ultrasound signal reflections. The processor determines respective elapsed time intervals between the trigger signal and each of the received echoes and converts one of the elapsed time intervals into a distance indication corresponding to the level of the material surface.

The system may be used to monitor the level of material in a plurality of vessels by placing an ultrasound transducer in each of the vessels. The transducers are connected to respective first terminals of a multiplexer having a second terminal that is coupled to the transmitter and the receiver. The second terminal is selectively coupled to each of the first terminals responsive to a multiplexer control signal selectively generated by the processor. As a result, the transmitter selectively applies a transmit signal to one of the ultrasound transducers through the multiplexer to cause the transducer to generate an ultrasound signal and the electronic receiver generates a receive signal responsive to the reflections of the ultrasound signal from the surface of the material. The transducers in the respective vessels may be adapted for optimum performance at a respective operating frequency. If so, the transmitter further includes a variable frequency generator generating the transmit signal at a frequency corresponding to a frequency control signal. The frequency control signal is generated by the processor from a table recording the value of the respective operating frequency for each of the transducers. The processor generates the frequency control signal in synchronism with the multiplexer control signal in accordance with the operating frequencies recorded in the table. The receiver may include a programmable bandpass filter through which the receive signal is coupled. The pass band of the programmable bandpass filter is designated by a bandpass frequency control signal generated by the processor in synchronism with the frequency control signal. Consequently, the bandpass filter is tuned to the frequency of the reflected transmit signal as the transmitter selectively applies transmit signals corresponding to the respective operating frequencies of the transducer to which the transmitter is connected.

The transmitter and receiver may be coupled to the transducer through a transmit/receive isolation switch. The transmit/receive isolation switch couples the transmitter to the transducer and isolates the receiver from the transducer and the transmitter when the transmitter is outputting the transmit signal. When the transmitter is not outputting the transmit signal, the transmit/receive isolation switch couples the receiver to the transducer so that the receiver generates a receive signal responsive to the reflections of the ultrasound signal from the surface of the material.

The ultrasound transmitter preferably includes a logic circuit for generating a transmit signal having a third harmonic that is attenuated so that the transmit signal approximates a sine wave. Each cycle of the transmit signal may be in the form of a positive pulse followed by a negative pulse having a duration equal to the duration of the positive pulse, with the period between the pulses being equal to the duration of the pulses.

The receiver preferably includes a charge amplifier having an input coupled to the transducer to generate an output signal corresponding to the charge created by the transducer responsive to each of the reflections of the ultrasound signal. The system also preferably includes a programmable gain amplifier through which the receive signal is coupled. The programmable gain amplifier has a gain determined by a gain control signal which is also generated by the processor.

The processor has a number of operating features to maximize the rate at which the level of the material in the vessel can be determined. The processor preferably adjusts the repetition rate of the trigger signals as a function of the elapsed time intervals so that the repetition rate is higher for shorter elapsed time intervals and lower for longer elapsed time intervals. The processor may also control the duration of the transmit signal as a function of the elapsed time intervals so that the duration of the transmit signal is shorter for shorter elapsed time intervals and longer for longer elapsed time intervals.

The system also compensates for an exponentially decaying "ringdown" signal that is generated in the transducer immediately following the generation of the ultrasound signal. The processor may determine a ringdown time when the signals corresponding to the ringdown signal have decayed to a predetermined level. The signals prior to the ringdown time are ignored and the signals subsequent to the ringdown time are then processed to determine the level of material in the vessel. As a result, the minimum ranging distance is set as a function of the ringdown characteristics of the transducer. The processor may also periodically record signals corresponding to the ringdown signal to obtain a profile of the amplitude of the ringdown signal as a function of elapsed time from the termination of the transmit signal. Signals corresponding to the ultrasound signal reflections are then compared to the recorded signals corresponding to the ringdown signal at corresponding times to identify signal reflections having amplitudes greater than the amplitude of the ringdown signal. The level of material in the vessel is then determined from received echoes having an amplitude greater than the amplitude of the ringdown signal. The received echoes are thus thresholded by the time-varying ringdown profile.

The inventive acoustic ranging system preferably deals with noise, interference, and spurious reflection problems by a number of techniques. First, the processor compares each distance indication to a plurality of previously obtained distance indications, and reports the distance indication as a valid distance indication only if predetermined criteria in the comparison is satisfied. In the preferred embodiment, this criteria is that the distance indication and the plurality of previous distance indications must correspond to respective distances that are either all greater than a distance reference value or are all less than the distance reference value. Second, the processor obtains a sequence of elapsed time intervals between the trigger signal and respective received echoes. The final elapsed time interval in the sequence is then used to provide a distance indication corresponding to the level of the material surface. By determining the material level from the most distant ultrasound reflection, the system is insensitive to reflections from ledges, objects, etc. positioned above the material surface. Third, the processor may reject any distance indication purportedly corresponding to the level of the material surface unless the distance indication falls into a predetermined range of distances.

DETAILED DESCRIPTION OF THE INVENTION

Figure 1:
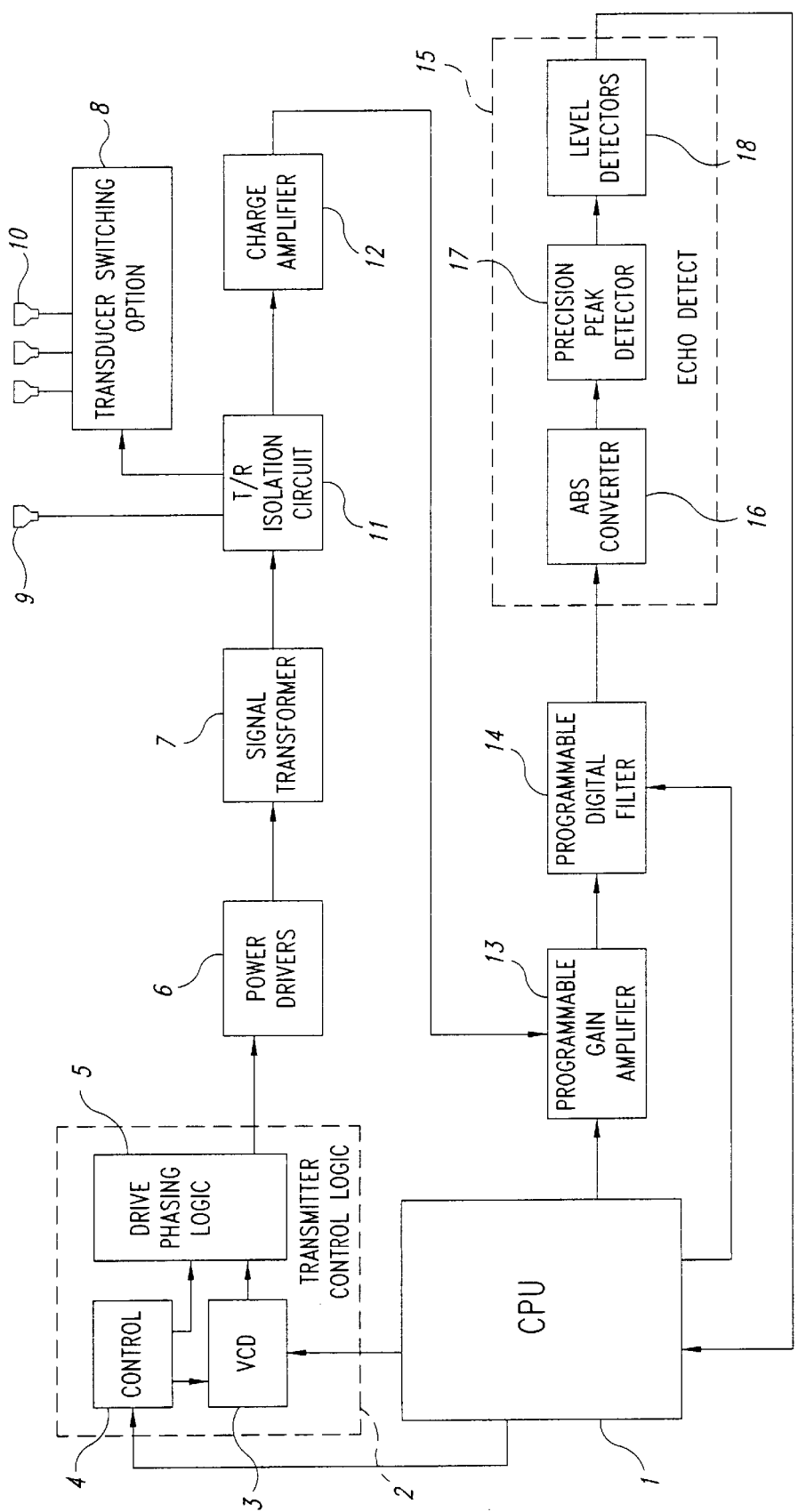
FIG. 1 is a simplified block diagram of the preferred embodiment of the present invention.

Referring to FIG. 1, a microprocessor (CPU) 1 activates a transmitter 2 to produce transmit bursts of the proper frequency, burst duration, and repetition rate. These parameters are preselected for each specific class of transducer. For example, a frequency of 43 KHz would be selected for a transducer which is designed to be resonant at this frequency. The burst duration, i.e., the number of cycles in the transmitted sound burst, is selected as a function of maximizing echo amplitude and/or minimum tracking range requirements. The repetition rate, i.e., the rate at which the transmitted bursts occur, is selected on the basis of echo turn-around time as sufficient time must be allotted for the sound bursts to travel from the transducer to the surface of the material and back again in a maximum tracking range situation when the vessel or container is almost empty.

Figure 2:
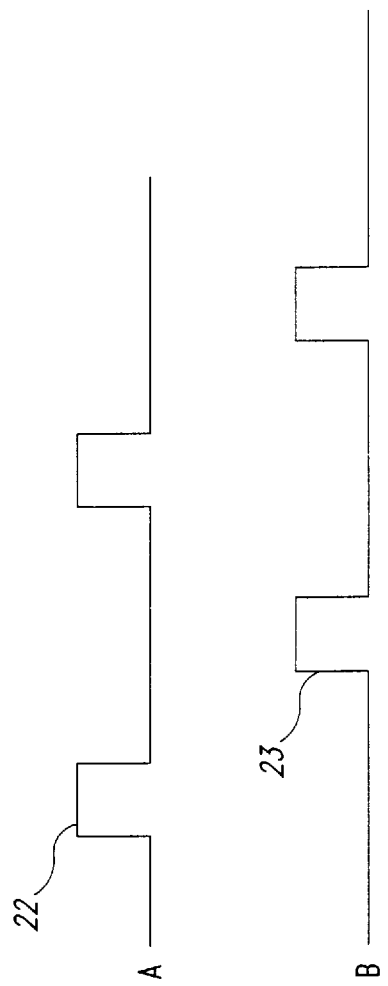
FIG. 2 is a waveform diagram showing signals present in the transmitter section used in the embodiment of FIG. 1.

The transmitter 2 includes a voltage-controlled oscillator (VCO) 3 that generates the signal frequency which is gated into bursts by control logic 4 and applied to drive phasing logic 5. The drive phasing logic 5 generates two 25% duty cycle pulse trains 180 degrees out of phase with each other, as illustrated in FIG. 2. The outputs from the transmitter 2 are applied to a power driver 6 which boosts the amplitudes of the signals and applies them to a transducer 9 via a signal transformer 7 and a transmit/receive (T/R) isolation circuit 11. In an embodiment of the invention in which multiple transducers are mounted in respective vessels or containers, a multiplexer 8 sequentially applies the signal, via switching relays, to multiple transducers 10.

Regardless of whether or not multiple transducers 10 are used, the return signal generated by the transducer(s) 9 or 10 in response to an echo is received through the transmit/receive (T/R) isolation circuit 11, amplified by a charge amplifier 12 and further amplified, or attenuated in the case of strong echoes originating from targets close to the transducer 9 or 10, by a CPU controlled programmable gain amplifier 13. The charge amplifier 12 and the programmable gain amplifier 13 are explained in further detail with respect to FIG. 5.

After being output from the programmable gain amplifier 13, the amplified return signal passes through a programmable digital filter 14, also controlled with respect to bandpass frequency by the CPU 1, to an echo detect subsystem 15. The echo detect subsystem 15 includes a absolute value converter 16 that rectifies the amplified return signal and applies it to a precision peak detector 17 and then to a conventional level detector 18. The output of the level detector 18 is applied to an interrupt input INT of the CPU 1 so that the CPU 1 can determine the elapsed time from when it triggered the transmit pulse. The level detector thresholds are program controlled. The techniques by which this is achieved are explained below with reference to FIGS. 6, 7, and 9.

Returning to FIG. 2, the non-overlapping pulses 22, 23 facilitates the use of relatively slow, inexpensive transistors in the power driver 6 and a smaller signal transformer 7 which benefits from the longer recovery time available from the reduced duty cycle. This arrangement suppresses the third harmonic, which is present in square-wave drive systems, producing a final drive waveform more closely approximating the sinusoidal shape considered optimum for the transducer. The presence of ringing on the waveform is also significantly reduced.

Figure 3:
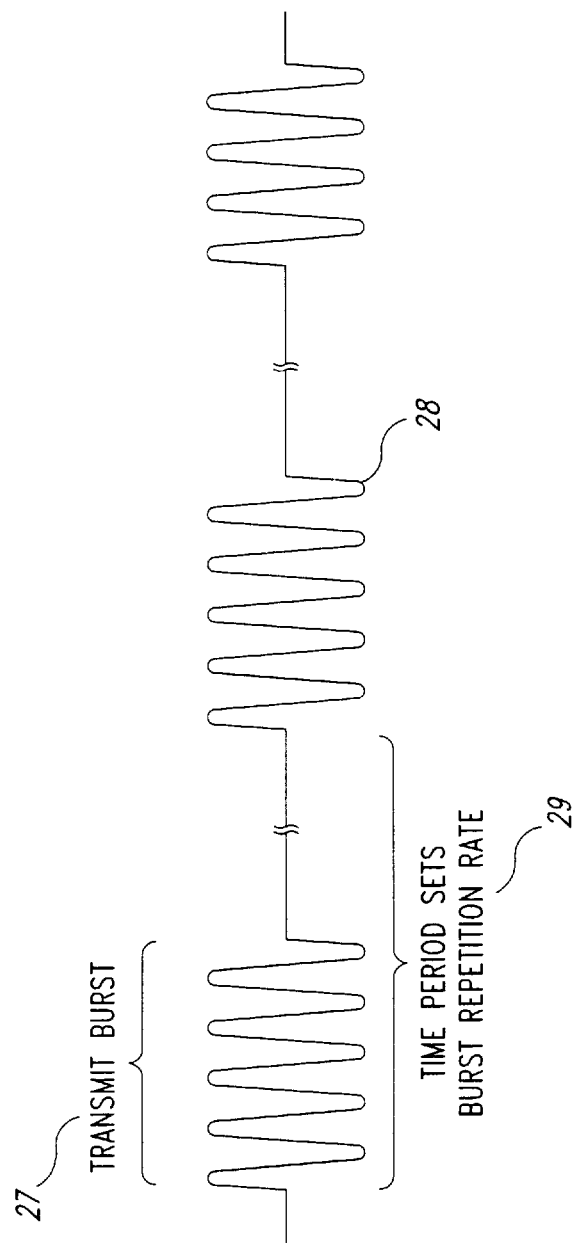
FIG. 3 is a waveform diagram showing a typical series of transmitted ultrasound bursts.

The waveform diagram of FIG. 3 shows three consecutive transmitted signal bursts 27, each comprising five cycles of the transducer operating frequency 28, spaced by a time period 29 which is a function of the burst repetition rate. This period varies with target distance and will typically extend from approximately 50 milliseconds to 360 milliseconds.

Figure 4:
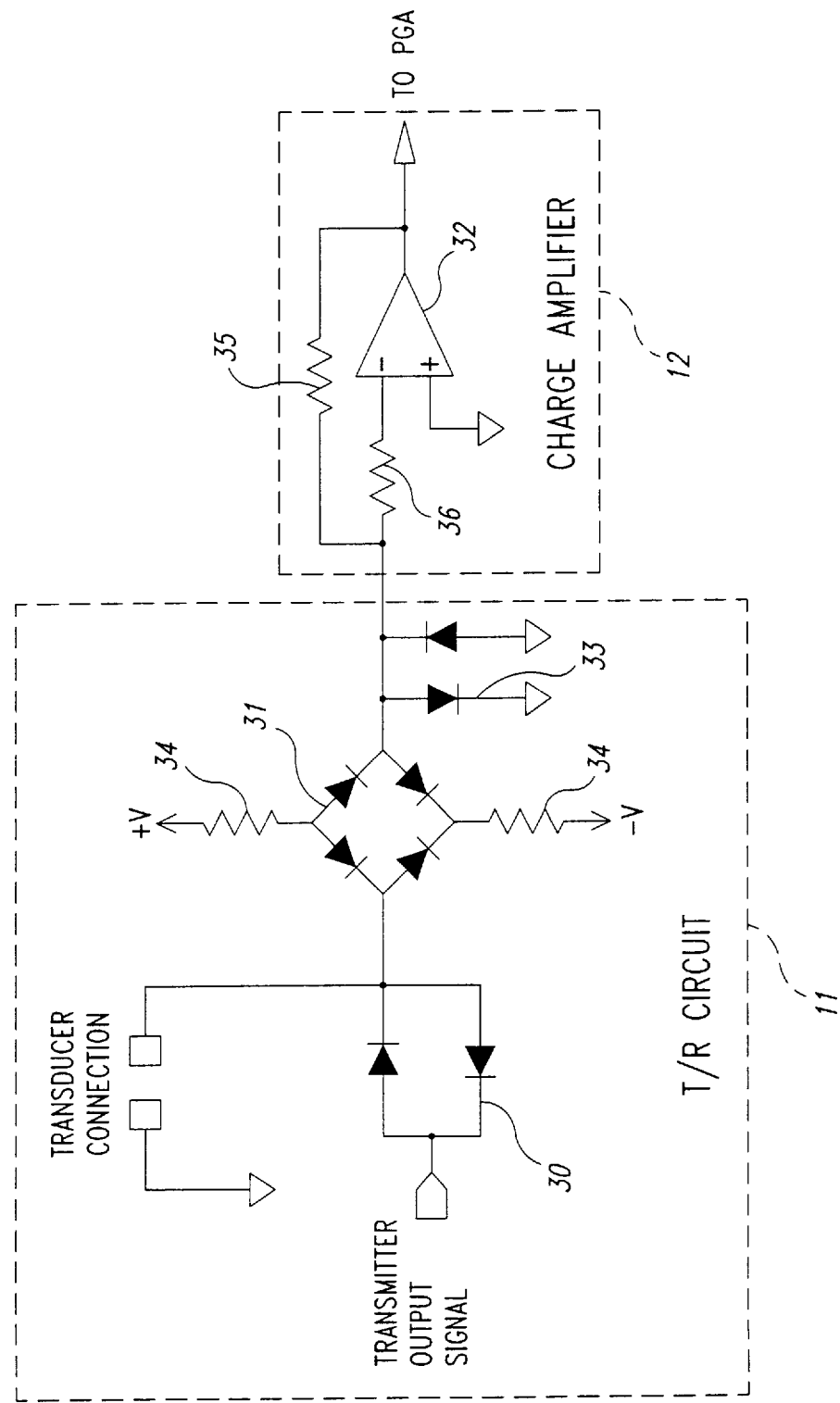
FIG. 4 is a schematic of the transmit/receive (T/R) isolation circuit and modified charge amplifier used in the preferred embodiment of FIG. 1.

The transmit/receive (T/R) isolation circuit 11 and the charge amplifier 12 are shown in greater detail in FIG. 4. The T/R isolation circuit 11 isolates the charge amplifier 12 (FIG. 1) during transmissions, and isolates the signal transformer 7 (FIG. 1) during the period when echo signals are received. This function is commonly accomplished by an active switch arrangement, while the present invention utilizes a passive component system. More specifically, a pair of isolation diodes 30 decouple the small echo signal from the signal transformer 7, as the echo signal would have to exceed approximately 1.2V peak-to-peak in amplitude to pass through the diodes 30. The echo signal will typically be below this level, and any larger signal will merely be attenuated to this amplitude. The transducer 9 (FIG. 1) is coupled to the charge amplifier 12 through a diode bridge 31. The diode bridge 31 is continuously forward biased to allow even the smallest echo signal to pass to the charge amplifier 12. However, the signal from the signal transformer 7 may have an amplitude in excess of 1000V peak-to-peak, and must be prevented from reaching the charge amplifier 12. The bias current in the diode bridge 31 is set to a low level by a pair of series resistors 34 which allows the diodes 31 to be reverse biased by the transmitted signal, thereby preventing the transmitted signal from reaching the charge amplifier 12. A pair of clipping diodes 33 further attenuate any portion of the transmitted signal that passes through the diode bridge 31 to further protect the charge amplifier 12 from the transmitted signal. The clipping diodes 33 limit the maximum voltage of the signal applied to the charge amplifier 12 to about ±0.6 volts. The clipping diodes 33 do not attenuate the echo signals since the amplitudes of the echo signals are less than the approximately 1.2V peak-to-peak clipping level of the clipping diodes 33.

The charge amplifier 12, which is also shown in FIG. 4, responds to the charge output of the transducer 9. The charge amplifier 12 includes an operational amplifier 32 having a feedback resistor 35 connected between the output of the amplifier 32 and the output of the T/R isolation circuit 11, and an input resistor 36 coupling the output of the T/R isolation circuit 11 to the inverting input of the amplifier 32. The charge amplifier 12 amplifies the charge produced by the transducer 9 or 10 instead of responding to a voltage developed across a resistor, which would be attenuated by charging of the cable capacitance. Thus the cable capacitance has a minimal effect on the signal, facilitating the use of longer cable runs. The voltage output from the charge amplifier 12 is given by the formula: $V_o = I * R_f$ where I is the magnitude of the input current and $R_f$ is the value of the feedback resistor 35. The input current I is the product of the charge Q generated by the transducer multiplied by the operating frequency F, or $I = Q \times F$. Thus, I is a function of time and increases with frequency.

Figure 5:
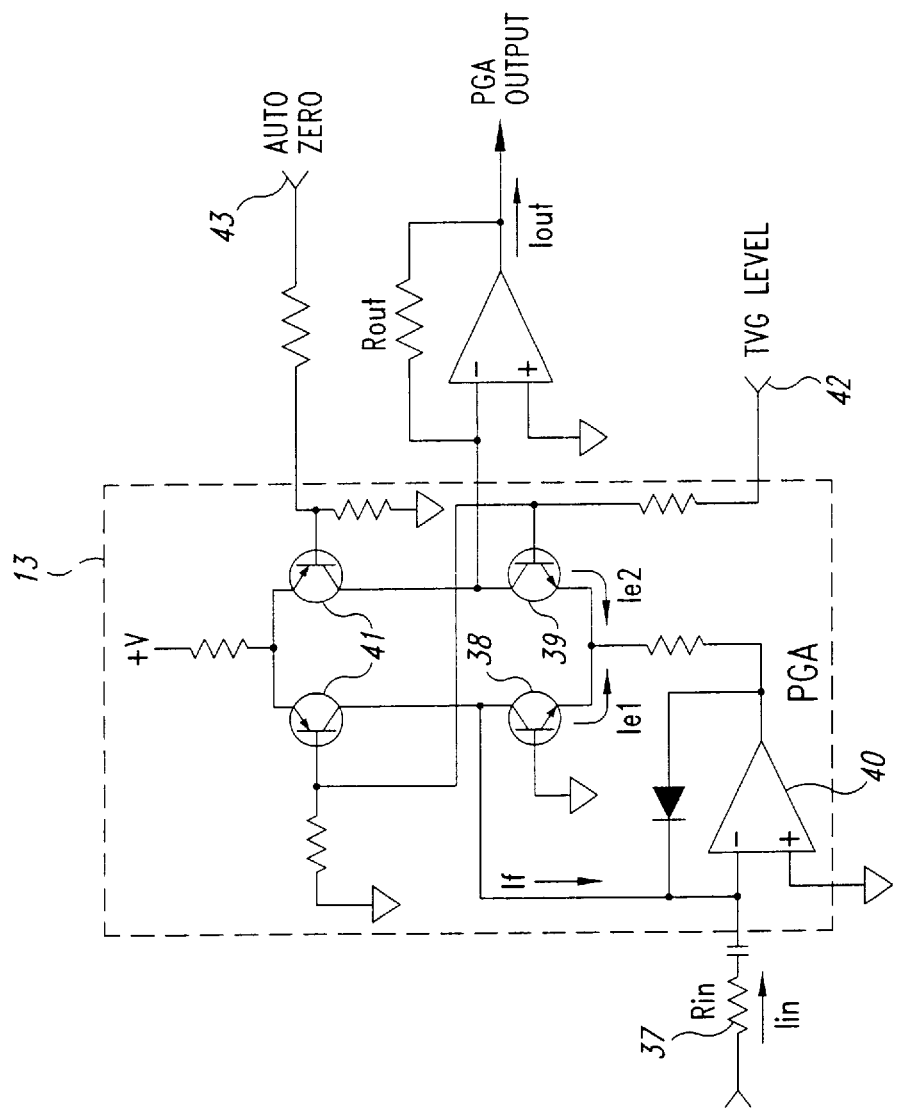
FIG. 5 is a schematic of the charge amplifier receiver and programmable gain amplifier incorporated in the preferred embodiment of FIG. 1.

FIG. 5 shows the programmable gain amplifier 13 which receives the output of the charge amplifier 12. As explained in greater detail below, the gain of the amplifier 13 is adjusted so that the received echo of the transmit pulse reflected from the surface of the material has the correct amplitude to trigger the level detectors 18 (FIG. 1) and generate a pulse that interrupts the CPU 1. If the gain of the amplifier 13 was set too high, reflections from objects above the material surface might generate a premature interrupt of the CPU 1. If the gain of the amplifier 13 was set too low, the reflection from the material surface might not be detected by the level detectors 18, and the CPU 1 would not be interrupted at the proper time.

The programmable gain amplifier 13 amplifies or attenuates the signal from the charge amplifier 12 with a dynamic range in excess of 30,000:1. The principal elements of the programmable gain amplifier 13 are a pair of matched input and output transistors 38, 39, respectively, and a feedback amplifier 40 that receives the output of the charge amplifier through a series resistor/capacitor circuit 37. The operating current for the input transistor 38 and the output transistor 39 is provided by a pair of constant current source transistors 41, which keep the sum of the currents through the transistors 38, 39 constant. When the gain control (TVG) input 42 is at zero volts, the current Ie1 and Ie2 through the transistors 38, 39, respectively, are equal. The gain of the programmable gain amplifier 13 is equal to the ratio of the currents Ie1/Ie2, which, in the case of TVG 42 equal to zero volts, is unity gain. As the gain control voltage TVG 42 is increased, Ie2 increases while Ie1 decreases as conduction through the source transistor 41 decreases. The feedback current, $I_f$, from the input transistor 38 always equals the input current, $I_{in}$. The level of the gain control voltage TVG 42 applied to the base of the output transistor 39 determines the ratio of current flow between the input transistor 38 and output transistor 39, facilitating a very high ratio of amplification or attenuation. The output current $I_{out}$ is given by the formula: $I_{out} = Ie2$. The output voltage $V_{out}$ is given by the formula: $V_{out} = I_{out} \times R_{out}$, and the input current $I_{in}$ is given by the formula: $I_{in} = V_{in}/R_{in}$. After combining these formulae, the output voltage $V_{out}$ as a function of the input current $I_{in}$ is given by the formula: $V_{out} = I_{in} \times gain \times R_{out}$. An auto-zero voltage 43 is fed back to correct for any gain mismatch in the constant current transistors 41 that would otherwise introduce errors over the gain range.

The programmable gain amplifier 13 facilitates the application of time variable gain (TVG) to the received signal in response to variations in signal strength as a function of target distance. The low noise level of this circuit coupled with its wide dynamic range increases the tracking range of a given transducer 9 beyond its previously established limits.

Figure 6:
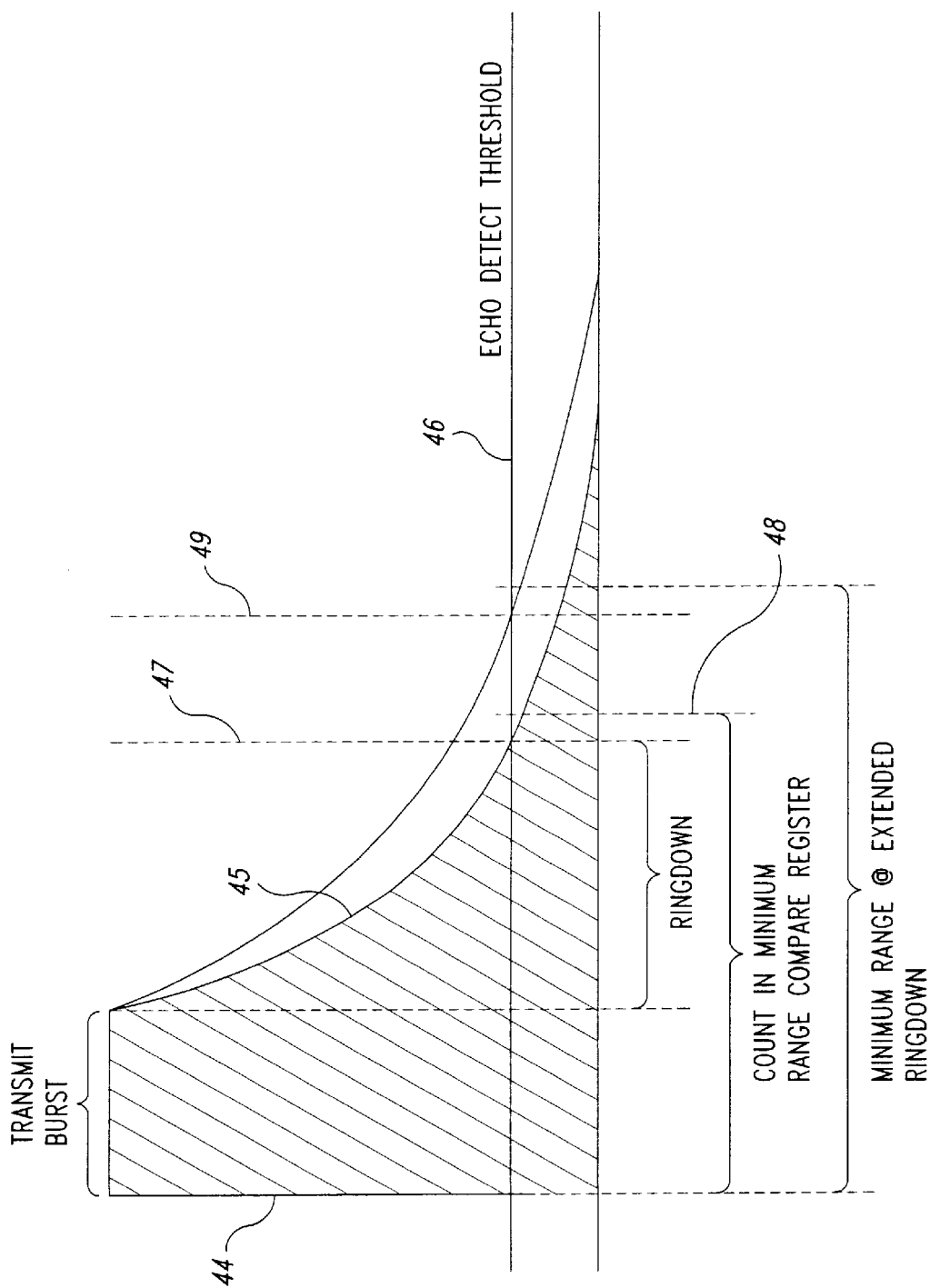
FIG. 6 is a graph illustrating a technique utilized to reduce the minimum tracking range of the preferred embodiment of FIG. 1.

The amplitude of a echo signal responsive to a typical transmission is shown in FIG. 6. At the termination of the transmit burst 44 the transducer 9 will continue to ring, i.e., oscillate, at its natural frequency for a time period determined by its damping characteristics and other factors. During this "ringdown" period, the amplitude of the ringdown signal 45 decreases exponentially. At point 47, the amplitude of the ringdown signal 45 crosses an echo detection threshold 46, i.e., the amplitude at which echo signals can be detected. At this point 47, the CPU 1 is interrupted, and it executes a simple interrupt routine that saves the value of a counter which was activated at the start of the transmit burst 44 (as explained below). The counter valve is saved in a minimum range compare register (internal to the CPU 1 of FIG. 1) and becomes the minimum range value. A predetermined count value corresponding to time 48 is added to increase immunity to spurious noises near the threshold. Echo signals from targets inside a range corresponding to this count value are excluded. A ringdown signal 49 having a longer ringdown time takes longer to cross the echo detection threshold 46 thereby increasing the count value. As a result, the time period within which targets are excluded is increased, thereby extending the minimum range at which levels can be detected. In this manner, the minimum tracking range of the preferred embodiment shown in FIG. 1 is automatically adjusted as a function of the ringdown characteristics of the transducer 9 or 10.

Figure 7:
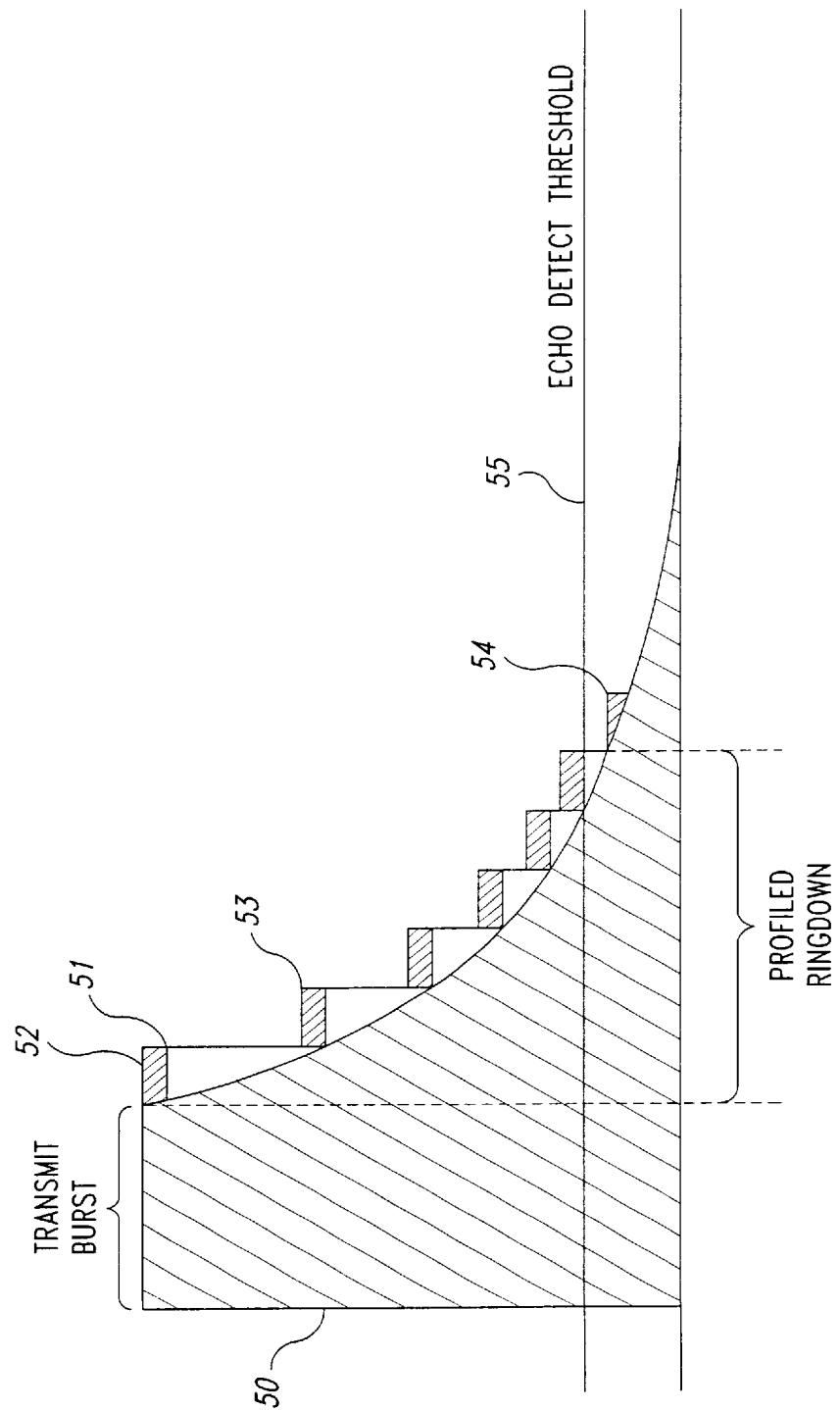
FIG. 7 is a graph illustrating another technique utilized to reduce the minimum tracking range of the preferred embodiment of FIG. 1.

The ringdown characteristics of the transducer 9 or 10 are determined in a transducer ringdown profiling process which can be explained with reference to FIG. 7. As shown in FIG.

7, the echo detection comparator threshold level 55 is dynamically varied by CPU 1 to follow the transducer ringdown slope and other near-field resonances. In other words, although the threshold of the level detectors 18 is constant, it is effectively varied by varying the gain of the amplifier 13. Thus, for example, if the threshold of the level detectors 18 is $V_T$ and the variable gain from the charge amplifier 12 to the level detectors 18 is 6, the effective threshold of the level detectors 18 at the output of the charge amplifier is the product of 6 and $V_T$. The time period representing a 2-inch distance 51 immediately following termination of the transmit burst 50 is profiled by a successive approximation technique whereby the voltage level of the ringdown signal burst is determined. The approximation process is repeated until the final threshold value of the level detector 18 is determined for that segment (i.e., period of time after the transmit pulse) causing the level detectors 18 to detect the ringdown signal. A predetermined count value is added and the final value is saved, setting the effective echo detection comparator threshold level 52. The next 2-inch segment 53 is profiled in the same manner, followed by successive sections until the predetermined profiling range is completed the result is a table of gain values for the amplifier 13 for each of many time periods following the transmit pulse. Should the final step 54 be below the separately defined final threshold 55, the final threshold prevails for this section. To be detected, target signals must be received after the time that the ringdown signal falls below the echo detection threshold 55. As a result, ringdown noise is excluded from the target detection processing. Wanted echo signals in the near field have sufficient amplitude to exceed the threshold levels within the ringdown field, facilitating material tracking at significantly shorter ranges than otherwise possible.

Figure 8:
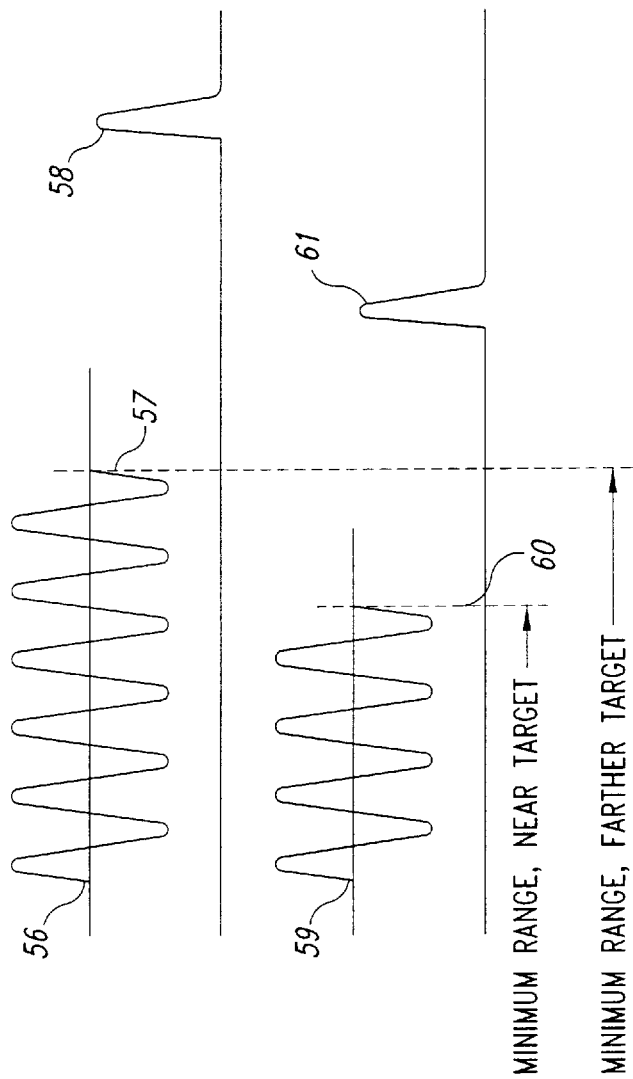
FIG. 8 is a waveform diagram showing two different ultrasound pulses of different duration present in the preferred embodiment of FIG. 1.

The minimum tracking range is further reduced by dynamic variation of the transmit burst duration as a function of target distance, as illustrated in FIG. 8. As shown in FIG. 8A, the transmit burst 56 comprises a specified number of cycles of the fundamental transducer frequency. The duration of the burst 56 determines the minimum range of the material level since the end 57 of the burst must have occurred before an echo from the beginning of the burst 56 is received. Preferably, the duration of the burst 56 is less than half the time from the beginning of the burst 56 to receipt of an echo 58 from the surface of the material. As shown in FIG. 8B, when the echo 61 is received earlier, the number of cycles in the transmit burst 59 is proportionately reduced, thereby reducing the duration of the burst 59 and hence the minimum tracking range to 60. A shorter burst 59 can be used at closer ranges because less energy in the transmitted signal is required at shorter distances, thereby maintaining the ability of the preferred embodiment to track material level.

Figure 9:
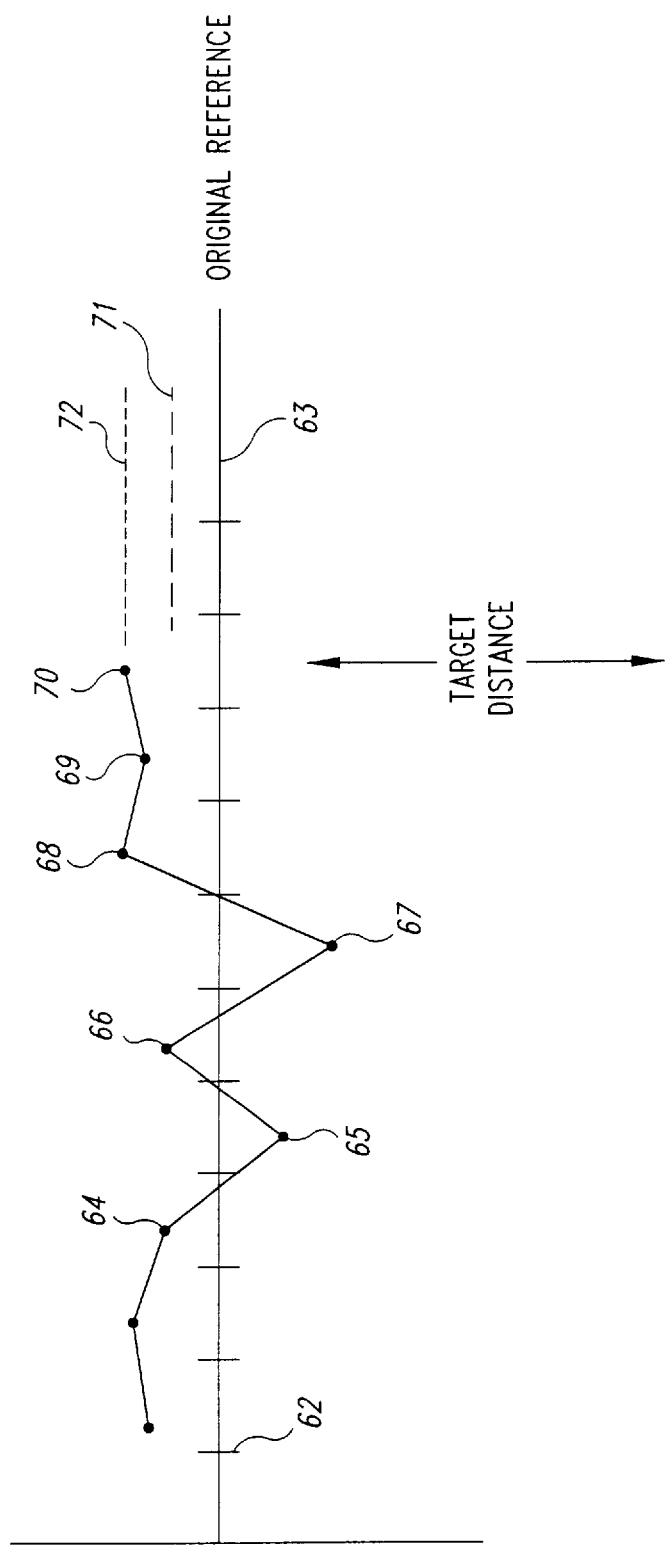
FIG. 9 is a graph illustrating the signal processing technique applied to the echo detect section used in the preferred embodiment of FIG. 1 to eliminate erratic level measurements.

As mentioned above, prior art acoustic level measuring systems suffer from variations in the perceived target distances measured by successive transmissions—a phenomena known as "jitter." To avoid this problem, the preferred embodiment of FIG. 1 uses a jitter filter which is explained with reference to FIG. 9. The jitter filter is implemented in software executed by the CPU 1 (FIG. 1) as explained below. FIG. 9 shows the times of occurrence of transmit bursts 62 along with the receipt times of corresponding echoes signals 64, 65, . . . 70. The position of each echo signal 66–70 is plotted on the Y-axis to correspond to the level of the material surface generating such echo signal 66–70. An echo detection reference level 63 represents a time period on the Y-axis corresponding to a predetermined target distance corresponding to the true level of the material surface. Echo signals 65, 66, and 67 represent a jitter condition, i.e., a variation in perceived material surface level around the true level. These echo signals are excluded from consideration by the anti-jitter filter which requires a predetermined sequence of echoes to appear consecutively on the same side of the reference level. Should this number be three, for example, then echoes signals 68, 69, and 70 would qualify for consideration. The value of the last echo signal 70 in the group is compared to the existing reference level 63, and the difference is multiplied by a predetermined percentage of this difference. The reference level is changed accordingly. In the example, selecting a percentage of 50% moves the reference level to a position 71 which is midway between the original reference level 63 and the reference level of the last qualified echo 70. The process repeats for each qualified group of echoes until the new reference level 72 reaches the value of the last echo 70. The effect of this is a gradual change in material level presentation in applications where the conditions in the storage vessel or container create erratic echo responses. Alternatively, a selected change rate of 100% would result in the reference level instantaneously changing to the last qualified level value. In either case the filtering function remains active as unqualified echo signals are excluded. The preferred embodiment of FIG. 1 facilitates the establishment of an initial reference level immediately following system activation based on the first echoes, thereby bypassing the more time consuming step-change process. Thus, target acquisition is very rapid when power is initially applied to the system. The filtering process resumes immediately following the initial establishment of the new reference level.

As explained above with reference to FIG. 1, the operation of the preferred embodiment is primarily controlled by a CPU 1. The CPU 1 operates according to a main program which will be explained with reference to the flow chart of FIG. 10. The program is entered at 100, and the system is initialized at 102 by clearing flags, setting variables, etc. in a conventional manner. The program then checks at 104 to determine if an input key (part of the CPU 1) is pressed. If so, the program executes a conventional key-press processing routine at step 106 to input information designated by the key pad. The program then checks at 110 to determine if commands are being applied to the CPU 1 through a conventional serial bus and, if so, processes those commands at 112.

The preferred embodiment of the invention periodically performs an analysis of the loss of echo in the system. Accordingly, the program determines at 116 if is time to once again check for echo loss, and, if so, provides an update of the echo loss status at 118. The CPU 1 also periodically updates a display (also part of the CPU 1) of the level of material in the vessel. This is accomplished by the main program checking at 120 to determine if it is time to update the display, and, if so, updating the display with the new material level at 122.

The program then checks at 126 to determine if the process of determining the level of material in the vessel has been completed. If not, the program branches to 130 where data from the previous channel level determination is calculated by the CPU 1. This data includes the frequency of the transmission, and a count of the time from the transmission to the receipt of an echo. The anti-jitter algorithm is also processed at this time, as explained above with reference to FIG. 9.

If the program determines at step 126 that the process of determining the level of material in the vessel has been completed, the program branches to 132 where the system is initialized for the next channel.

After the program has performed all of the actions at step 132, it checks at 136 to determine if noise is present, and, if so, performs a noise immunity routine described below at step 138. Finally, the CPU 1 applies a pulse to the transmitter 2 to generate a transmission at step 140.

Figure 10:
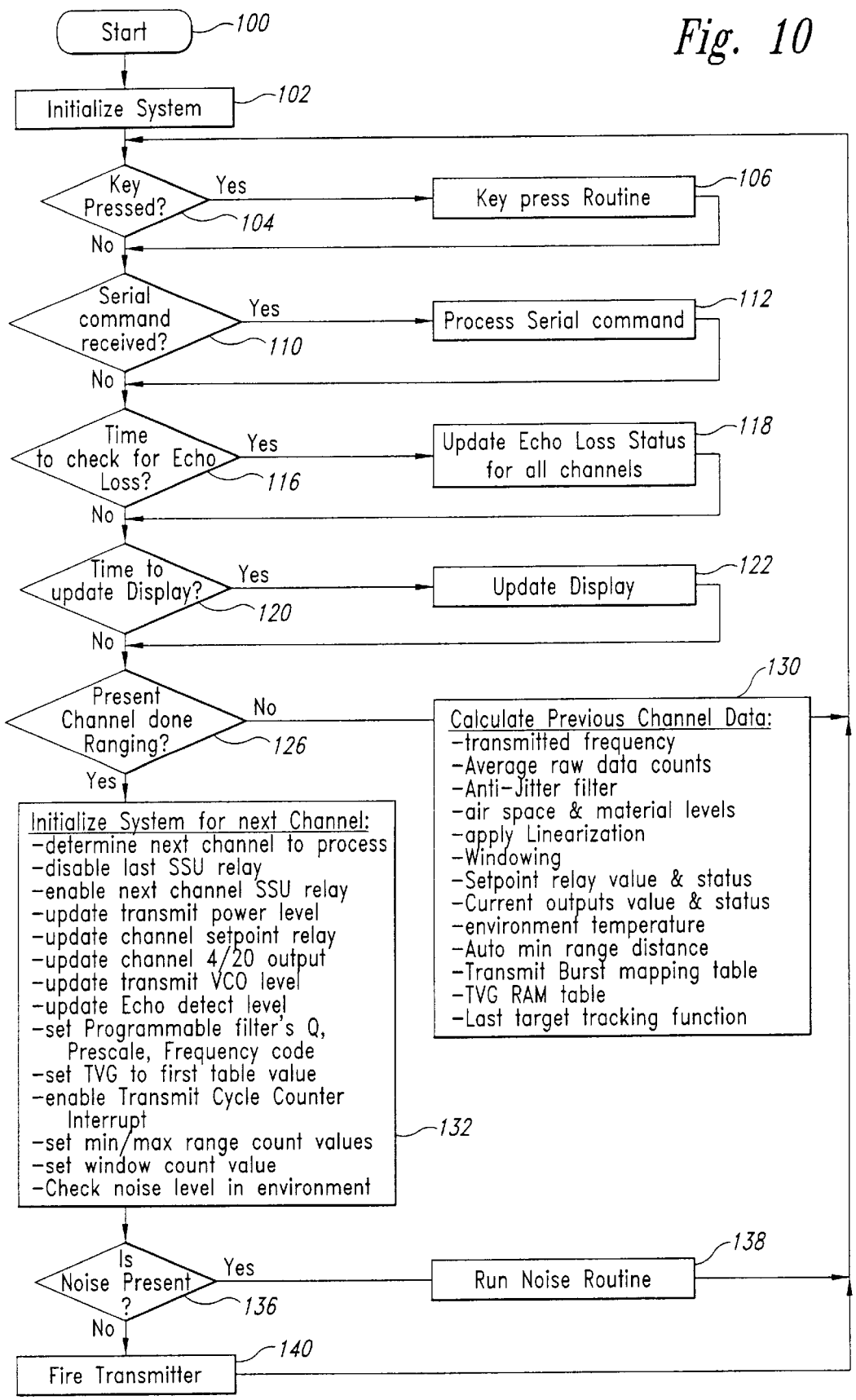
FIG. 10 is a flow chart of system operating software used in the preferred embodiment of FIG. 1.

As explained above, in prior art acoustic level measuring systems, echo signals may be received from a large number of objects in the vessel in addition to the surface of the material in the vessel. The preferred embodiment of the invention rejects these multiple echo signals to process the echo signal from the surface of the material by responding only to the echo signal from the farthest reflector. More specifically, the CPU 1 executes a last target tracking algorithm to facilitate the monitoring of levels located below obstructions such as ledges, etc., as described above. Accordingly, a predetermined maximum range value representing a distance which slightly exceeds the space between the transducer and the material level at its lowest point, i.e., typically the bottom of the container, is initially entered into a target count register in the CPU 1 at step 102 (FIG. 10). As the transmit burst is initiated and the ranging period begins, a first echo corresponding to the elapsed time between the transmitted burst and the received echo is received. This new value will overwrite the original value in the target count register. This process continues for each detected echo until the maximum range point is reached, at which point the last value stored in the target count register is accepted as the level of interest. The apparatus therefore excludes all unwanted echoes which are generated above the surface of the material being monitored.

Figure 11:
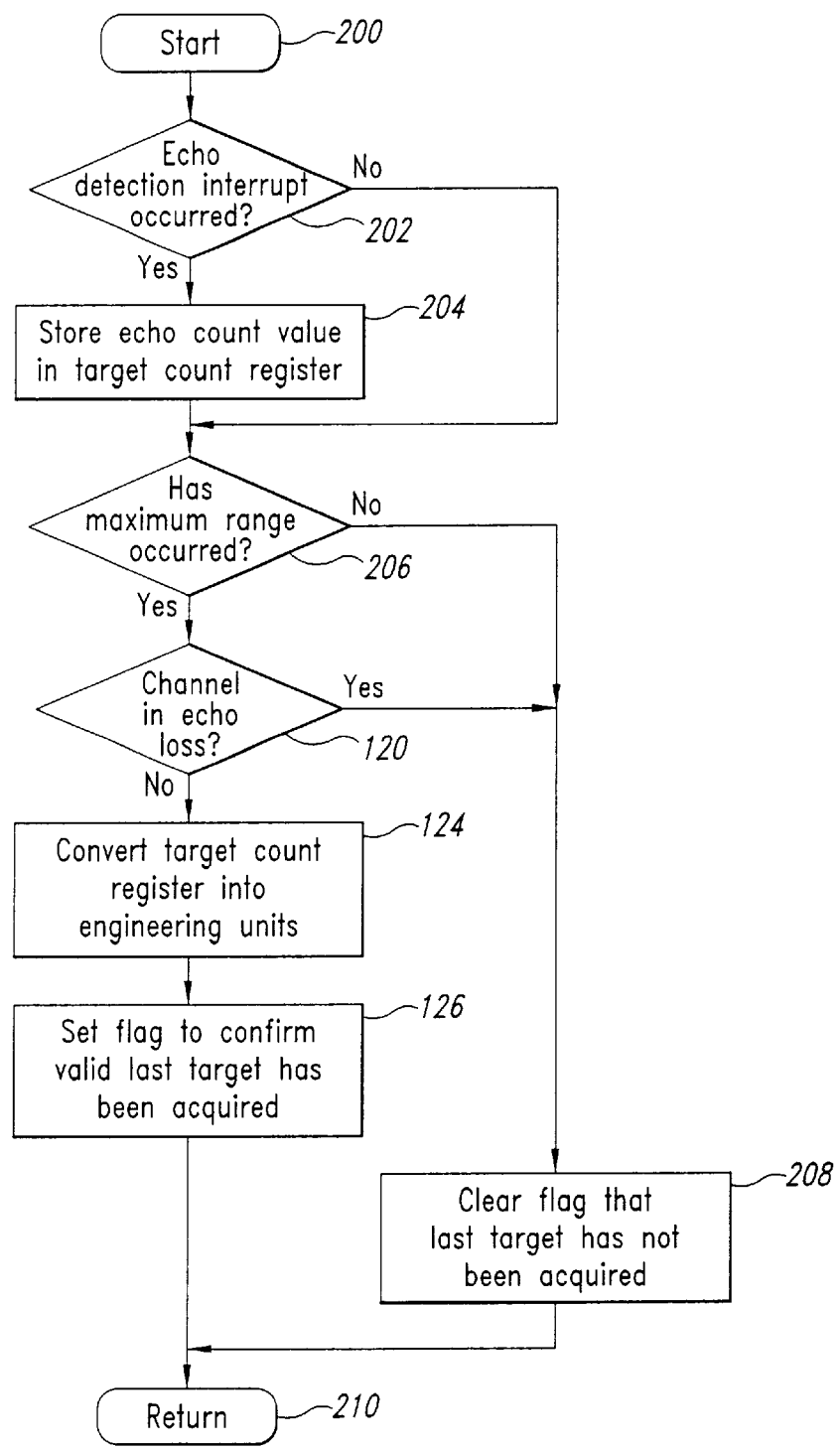
FIG. 11 is a flow chart of last target tracking software used in the preferred embodiment of FIG. 1.

The last target tracking routine is explained with reference to FIG. 11. When an echo is detected by the echo detector subsystem 15 (FIG. 1), the echo detector applies a pulse to an interrupt input of the CPU 1 to interrupt the CPU 1 in a conventional manner. The CPU 1 periodically enters the last target tracking routine at 200, and determines at 202 whether an echo detection interrupt has occurred since the last time the routine was executed. If so, the routine stores the current value of the target count at 204. If the routine does not determine at 202 that an echo detection interrupt has occurred, the routine bypasses step 204. In either case, the routine then determines at 206 if the maximum range has been reached. This step is accomplished by comparing the current target count value with the target count value initially entered into a target count register at step 102 (FIG. 10). If the maximum range has not been exceeded, the routine branches to 208 to clear a flag indicating that an echo signal corresponding the material surface has not yet been received. The routine then returns to the main program via step 210 exceeded.

If the routine determined at step 206 that the target count value has incremented to a value corresponding to the maximum range, then the last value that was entered into the target count register at step 204 must correspond to the level of the material in the vessel. Thus, when the routine determines at 206 that the count corresponding to the maximum range has been exceeded, the process of acquiring an echo signal from the material level has been completed. The routine then proceeds to step 210 where it determines if the current channel is in echo loss. If so, the routine branches to 208 and 210, as explained above. Otherwise, the routine converts the value stored in the target count register into appropriate units at 124 and sets a flag at 126 to confirm that the last target corresponding to the material level has been acquired.

From the foregoing, it will be appreciated that, although specific embodiments of the invention have been described herein for purposes of illustration, various modifications may be made without deviating from the spirit and scope of the invention. Accordingly, the invention is not to be limited except as by the appended claims.

I claim:

1. An acoustic ranging system for monitoring the level of material inside a vessel, comprising:

a transducer mounted in said vessel at a position and orientation adapted to direct an ultrasound signal toward the surface of said material and receive reflections of said ultrasound signal from the surface of said material;

an ultrasound transmitter coupled to said transducer, said ultrasound transmitter applying a transmit signal to said transducer responsive to a trigger signal thereby causing said transducer to generate said ultrasound signal, said transmit signal comprising a positive pulse followed by a negative pulse having a duration equal to the duration of said positive pulse, the period between said pulses being equal to the duration of said pulses;

an electronic receiver coupled to said transducer, said receiver generating a receive signal responsive to said reflections of said ultrasound signal from the surface of said material;

a signal detector coupled to said electronic receiver, said signal detector generating respective signal detect pulses responsive to detection of said receive signals; and a processor having an output coupled to said transmitter and an input coupled to said signal detector, said processor generating said trigger signal and coupling said trigger signal to said transmitter to cause said transmitter to generate said transmit signal, said processor receiving at least one of said signal detect pulses from said signal detector to identify said ultrasound signal reflections, said processor further determining respective elapsed time intervals between said trigger signal and at least one signal detect pulse from a received echo and converting one elapsed time interval into a distance indication corresponding to the level of the surface of said material.

2. An acoustic ranging system for monitoring the level of material inside a vessel, comprising:

a transducer mounted in said vessel at a position and orientation adapted to direct an ultrasound signal toward the surface of said material and receive reflections of said ultrasound signal from the surface of said material, an ultrasound transmitter coupled to said transducer said ultrasound transmitter applying a transmit signal to said transducer responsive to a trigger signal thereby causing said transducer to generate said ultrasound signal, an electronic receiver coupled to said transducer, said receiver generating a receive signal responsive to said reflections of said ultrasound signal from the surface of said material;

a signal detector coupled to said electronic receiver, said signal detector generating respective signal detect pulses responsive to detection of said receive signals;

a processor having an output coupled to said transmitter and an input coupled to said signal detector, said processor generating said trigger signal and coupling said trigger signal to said transmitter to cause said transmitter to generate said transmit signal, said processor receiving at least one of said signal detect pulses from said signal detector to identify said ultrasound signal reflections, said processor further determining respective elapsed time intervals between said trigger signal and at least one signal detect pulse from a received echo and converting one elapsed time interval into a distance indication corresponding to the level of the surface of said material, and a programmable gain amplifier coupling said electronic receiver to said signal detector, said programmable gain amplifier having a gain control input coupled to an output of said processor so that said processor can control the gain of said amplifier.

3. An acoustic ranging system for monitoring the level of material inside a vessel, comprising:

a transducer mounted in said vessel at a position and orientation adapted to direct an ultrasound signal toward the surface of said material and receive reflections of said ultrasound signal from the surface of said material;

an ultrasound transmitter coupled to said transducer said ultrasound transmitter applying a transmit signal to said transducer responsive to a trigger signal thereby causing said transducer to generate said ultrasound signal, said ultrasound transmitter including a logic circuit for generating said transmit signal, said transmit signal having a third harmonic that is attenuated so that said transmit signal approximates a sine wave;

an electronic receiver coupled to said transducer said receiver generating a receive signal responsive to said reflections of said ultrasound signal from the surface of said material, a signal detector coupled to the output terminal of said charge amplifier, said signal detector generating respective signal detect pulses responsive to detection of said receive signals, and a processor having an output coupled to said transmitter and an input coupled to said signal detector, said processor generating said trigger signal and coupling said trigger signal to said transmitter to cause said transmitter to generate said transmit signal, said processor receiving at least one of said signal detect pulses from said signal detector to identify said ultrasound signal reflections, said processor further determining respective elapsed time intervals between said trigger signal and at least one signal detect pulse from a received echo and converting one elapsed time interval into a distance indication corresponding to the level of the surface of said material.

4. An acoustic ranging system for monitoring the level of material inside a vessel, comprising:

a transducer mounted in said vessel at a position and orientation adapted to direct an ultrasound signal toward the surface of said material and receive reflections of said ultrasound signal from the surface of said material, an ultrasound transmitter coupled to said transducer, said ultrasound transmitter applying a transmit signal to said transducer responsive to a trigger signal thereby causing said transducer to generate said ultrasound signal;

an electronic receiver coupled to said transducer, said receiver generating a receive signal responsive to said reflections of said ultrasound signal from the surface of said material, said electronic receiver further comprising a charge amplifier having an input coupled to said transducer, said charge amplifier generating and applying to an output terminal an output signal corresponding to the charge created by said transducer responsive to each of said reflections of said ultrasound signal;

signal detector coupled to the output terminal of said charge amplifier, said signal detector generating respective signal detect pulses responsive to detection of said receive signals; and a processor having an output coupled to said transmitter and an input coupled to said signal detector, said processor generating said trigger signal and coupling said trigger signal to said transmitter to cause said transmitter to generate said transmit signal, said processor receiving at least one of said signal detect pulses from said signal detector to identify said ultrasound signal reflections, said processor further determining respective elapsed time intervals between said trigger signal and at least one signal detect pulse from a received echo and converting one elapsed time interval into a distance indication corresponding to the level of the surface of said material.

5. The system of claim 4 wherein said charge amplifier comprises:

an operational amplifier having an inverting input, a non-inverting input, and an output;

a first resistor connected between the input of said charge amplifier and the inverting input of said operational amplifier; and a second resistor connected between the output of said operational amplifier and the input of said charge amplifier.

6. The system of claim 4 wherein said processor further adjusts the repetition rate of said trigger signals as a function of said elapsed time interval so that said repetition rate is higher for shorter elapsed time intervals and said repetition rate is lower for longer elapsed time intervals.

7. The system of claim 6 wherein the repetition rate of said trigger signals is inversely proportional to said elapsed time intervals.

8. The system of claim 6 wherein said processor generates said trigger signal a predetermined time after said processor receives an echo from the surface of said material responsive to a previously transmitted ultrasound signal.

9. An acoustic ranging system for monitoring the level of material inside a vessel, comprising:

a transducer mounted in said vessel at a position and orientation adapted to direct an ultrasound signal toward the surface of said material and receive reflections of said ultrasound signal from the surface of said material;

an ultrasound transmitter coupled to said transducer, said ultrasound transmitter applying a transmit signal to said transducer responsive to a trigger signal thereby causing said transducer to generate said ultrasound signal, said ultrasound transmitter generating said transmit signal with a duration determined by a duration control signal applied to a control input terminal of said ultrasound transmitter:

an electronic receiver coupled to said transducer, said receiver generating a receive signal responsive to said reflections of said ultrasound signal from the surface of said material;

a signal detector coupled to said electronic receiver, said signal detector generating respective signal detect pulses responsive to detection of said receive signals; and a processor having an output coupled to said transmitter and an input coupled to said signal detector, said processor generating said trigger signal and coupling said trigger signal to said transmitter to cause said transmitter to generate said transmit signal, said processor receiving at least one of said signal detect pulses from said signal detector to identify said ultrasound signal reflections, said processor further determining respective elapsed time intervals between said trigger signal and at least one signal detect pulse from a received echo and converting one elapsed time interval into a distance indication corresponding to the level of the surface of said material, said processor further generating said duration control signal to adjust the duration of said transmit signal as a function of said elapsed time interval so that the duration of said transmit signal is shorter for shorter elapsed time intervals and the duration of said transmit signal is longer for longer elapsed time intervals.

10. An acoustic ranging system for monitoring the level of material inside a vessel, comprising:

a transducer mounted in said vessel at a position and orientation adapted to direct an ultrasound signal toward the surface of said material and receive reflections of said ultrasound signal from the surface of said material;

an ultrasound transmitter coupled to said transducer, said ultrasound transmitter applying a transmit signal to said transducer responsive to a trigger signal thereby causing said transducer to generate said ultrasound signal, said transmit signal further causing said transducer to generate an exponentially decaying ringdown signal immediately following said ultrasound signal;

an electronic receiver coupled to said transducer, said receiver generating a receive signal responsive to said reflections of said ultrasound signal from the surface of said material, said electronic receiver further generating a receive signal responsive to said ringdown signal and responsive to reflections of said ultrasound signal from the surface of said material;

a signal detector coupled to said electronic receiver, said signal detector generating respective signal detect pulses responsive to detection of said receive signals; and a processor having an output coupled to said transmitter and an input coupled to said signal detector, said processor generating said trigger signal and coupling said trigger signal to said transmitter to cause said transmitter to generate said transmit signal, said processor receiving at least one of said signal detect pulses from said signal detector to identify said ultrasound signal reflections, said processor further determining respective elapsed time intervals between said trigger signal and at least one signal detect pulse from a received echo and converting one elapsed time interval into a distance indication corresponding to the level of the surface of said material, said processor further determining a ringdown time when the receive signal corresponding to said ringdown signal has decayed to a predetermined level, processing signal detect pulses subsequent to said ringdown time to determine an elapsed time interval between said trigger signal and said signal detect pulse, and converting said elapsed time interval into a distance indication corresponding to the level of the surface of said material whereby the minimum elapsed time interval between said trigger signal and a signal detect pulse is set as a function of the ringdown characteristics of said transducer.

11. The system set of claim 10 wherein said processor further adds a predetermined value to said ringdown time to make said system less sensitive to noise signals.

12. An acoustic ranging system for monitoring the level of material inside a vessel, comprising:

a transducer mounted in said vessel at a position and orientation adapted to direct an ultrasound signal toward the surface of said material and receive reflections of said ultrasound signal from the surface of said material;

an ultrasound transmitter coupled to said transducer, said ultrasound transmitter applying a transmit signal to said transducer responsive to a trigger signal thereby causing said transducer to generate said ultrasound signal, said transmit signal further causing said transducer to generate an exponentially decaying ringdown signal immediately following said ultrasound signal;

an electronic receiver coupled to said transducer, said receiver generating a receive signal responsive to said reflections of said ultrasound signal from the surface of said material, said electronic receiver further generating a receive signal responsive to said ringdown signal and responsive to reflections of said ultrasound signal from the surface of said material;

a signal detector coupled to said electronic receiver, said signal detector generating respective signal detect pulses responsive to detection of said receive signals; and a processor having an output coupled to said transmitter and an input coupled to said signal detector, said processor generating said trigger signal and coupling said trigger signal to said transmitter to cause said transmitter to generate said transmit signal, said processor receiving at least one of said signal detect pulses from said signal detector to identify said ultrasound signal reflections, said processor further determining respective elapsed time intervals between said trigger signal and at least one signal detect pulse from a received echo and converting one elapsed time interval into a distance indication corresponding to the level of the surface of said material, said processor periodically recording the amplitude of receive signals corresponding to said ringdown signal to obtain a profile of the amplitude of said ringdown signal as a function of elapsed time from the termination of said transmit signal, comparing the amplitude of receive signals from said ultrasound signal reflections with the recorded amplitude of receive signals from said ringdown signal at corresponding times of occurrence to identify signal reflections having amplitudes greater than the amplitude of said ringdown signal at corresponding times, determining respective elapsed time intervals between said trigger signal and each signal detect pulse corresponding to a received echo having an amplitude greater than the amplitude of said ringdown signal, and converting one of said elapsed time intervals into a respective distance indication corresponding to the level of the surface of said material.

13. The system of claim 12 wherein said processor records a respective digital signal corresponding to said ringdown signal for time intervals following the termination of said transmit signal corresponding to successive 2 inch increments in the distance beneath said transducer.

14. The system of claim 12 wherein said processor determines respective elapsed time intervals between said trigger signal and signals detect pulses only if said signal detect pulses corresponding to a received echo having an amplitude that is greater than the amplitude of said ringdown signal by a predetermined value thereby making said system less sensitive to noise.

15. An acoustic ranging system for monitoring the level of material inside a vessel, comprising:

a transducer mounted in said vessel at a position and orientation adapted to direct an ultrasound signal toward the surface of said material and receive reflections of said ultrasound signal from the surface of said material;

an ultrasound transmitter coupled to said transducer, said ultrasound transmitter applying a transmit signal to said transducer responsive to a trigger signal thereby causing said transducer to generate said ultrasound signal;

an electronic receiver coupled to said transducer, said receiver generating a receive signal responsive to said reflections of said ultrasound signal from the surface of said material;

a signal detector coupled to said electronic receiver, said signal detector generating respective signal detect pulses responsive to detection of said receive signals; and a processor having an output coupled to said transmitter and an input coupled to said signal detector, said processor generating said trigger signal and coupling said trigger signal to said transmitter to cause said transmitter to generate said transmit signal, said processor receiving at least one of said signal detect pulses from said signal detector to identify said ultrasound signal reflections, said processor further determining respective elapsed time intervals between said trigger signal and at least one signal detect pulse from a received echo and converting one elapsed time interval into a distance indication corresponding to the level of the surface of said material, said processor further comparing said distance indication to a plurality of distance indications derived from previous intervals between said trigger signal and said received echoes, and reporting said distance indication as a valid distance indication only if predetermined criteria in said comparison between said distance indication and said plurality of distance indications derived from previous intervals is satisfied.

16. The system of claim 15 wherein said predetermined criteria is that said distance indication and said plurality of distance indications derived from previous intervals corresponds to respective distances that are either all greater than a distance reference value or are all less than said distance reference value.

17. The system of claim 16 wherein said processor modifies said distance reference value by changing said distance reference value after each distance indication is obtained by a predetermined percentage of the difference between said valid distance indication and said distance reference value.

18. An acoustic ranging system for monitoring the level of material inside a vessel, comprising:

a transducer mounted in said vessel at a position and orientation adapted to direct an ultrasound signal toward the surface of said material and receive reflections of said ultrasound signal from the surface of said material;

an ultrasound transmitter coupled to said transducer, said ultrasound transmitter applying a transmit signal to said transducer responsive to a trigger signal thereby causing said transducer to generate said ultrasound signal;

an electronic receiver coupled to said transducer, said receiver generating a receive signal responsive to said reflections of said ultrasound signal from the surface of said material;

a signal detector coupled to said electronic receiver, said signal detector generating respective signal detect pulses responsive to detection of said receive signals; and a processor having an output coupled to said transmitter and an input coupled to said signal detector, said processor generating said trigger signal and coupling said trigger signal to said transmitter to cause said transmitter to generate said transmit signal, said processor receiving at least one of said signal detect pulses from said signal detector to identify said ultrasound signal reflections, said processor further determining respective elapsed time intervals between said trigger signal and at least one signal detect pulse from a received echo and converting one elapsed time interval into a distance indication corresponding to the level of the surface of said material, said processor further determining a sequence of elapsed time intervals between said trigger signal and respective signal detect pulses and converting the last of said elapsed time intervals into a distance indication corresponding to the level of the surface of said material whereby said system identifies as the ultrasound reflection from surface of said material the ultrasound reflection that is most distant from said transducer.

19. An acoustic ranging system for monitoring the level of material inside a vessel, comprising:

a transducer mounted in said vessel at a position and orientation adapted to direct an ultrasound signal toward the surface of said material and receive reflections of said ultrasound signal from the surface of said material;

an ultrasound transmitter coupled to said transducer, said ultrasound transmitter applying a transmit signal to said transducer responsive to a trigger signal thereby causing said transducer to generate said ultrasound signal;

an electronic receiver coupled to said transducer,said receiver generating a receive signal responsive to said reflections of said ultrasound signal from the surface of said material;

a signal detector coupled to said electronic receiver, said signal detector generating respective signal detect pulses responsive to detection of said receive signals; and a processor having an output coupled to said transmitter and an input coupled to said signal detector, said processor generating said trigger signal and coupling said trigger signal to said transmitter to cause said transmitter to generate said transmit signal, said processor receiving at least one of said signal detect pulses from said signal detector to identify said ultrasound signal reflections, said processor further determining respective elapsed time intervals between said trigger signal and at least one signal detect pulse from a received echo and converting one elapsed time interval into a distance indication corresponding to the level of the surface of said material, said processor further determining respective elapsed time intervals between said trigger signal and each of said signal detect pulses and converting one of said elapsed time intervals into a respective distance indication corresponding to the level of the surface of said material only if said distance indication falls into a predetermined range of distances.

20. The system of claim 19 wherein said processor converts said elapsed time interval into a distance indication corresponding to the level of the surface of said material even if said distance indication falls outside said predetermined range of distances in the event that a predetermined number of distance indications derived from previous intervals between said trigger signal and said received echoes fall outside said predetermined range of distances.

21. An acoustic ranging system for monitoring the level of material inside a vessel, comprising:

a transducer mounted in said vessel at a position and orientation adapted to direct an ultrasound signal toward the surface of said material and receive reflections of said ultrasound signal from the surface of said material;

an ultrasound transmitter coupled to said transducer, said ultrasound transmitter applying a transmit signal to said transducer responsive to a trigger signal thereby causing said transducer to generate said ultrasound signal;

an electronic receiver coupled to said transducer, said receiver generating a receive signal responsive to said reflections of said ultrasound signal from the surface of said material;

a transmit/receive isolation switch coupled to said transmitter, said receiver, and said transducer, said transmit/receive switch coupling said transmitter to said transducer and isolating said receiver from said transducer and said transmitter when said transmitter is outputting said transmit signal so that transmit signal is coupled to said transducer through said transmit/receive switch responsive to said trigger signal thereby causing said transducer to generate said ultrasound signal, said transmit/receive switch coupling said receiver to said transducer when said transmitter is not outputting said transmit signal so that said receiver generates a receive signal responsive to said reflections of said ultrasound signal from the surface of said material;

a signal detector coupled to said electronic receiver, said signal detector generating respective signal detect pulses responsive to detection of said receive signals; and a processor having an output coupled to said transmitter and an input coupled to said signal detector, said processor generating said trigger signal and coupling said trigger signal to said transmitter to cause said transmitter to generate said transmit signal, said processor receiving at least one of said signal detect pulses from said signal detector to identify said ultrasound signal reflections, said processor further determining respective elapsed time intervals between said trigger signal and at least one signal detect pulse from a received echo and converting one elapsed time interval into a distance indication corresponding to the level of the surface of said material.

22. The ranging system of claim 21 wherein said transmit/receive switch comprises:

a pair of diodes connected in parallel with each other in opposite directions, said diodes being connected between said transmitter and a transducer terminal to which said transducer is connected, at least one of the diodes in said pair of diodes being forward-biased when said transmit signal is being output by said transmitter so that said transmit signal is coupled to said transducer thorough at least one of said pair of diodes;

a diode bridge connected between said transducer terminal and a receiver terminal to which said receiver is connected, the diodes in said diode bridge being reversed biased when said transmitter is outputting said transmit signal so that said diode bridge isolates said receiver from said transmitter; and a bias circuit coupled to said diode bridge, said bias circuit forward biasing the diodes in said diode bridge when said transmitter is not outputting said transmit signal so that said diode bridge couples said receiver to said transducer.

23. An acoustic ranging system for monitoring the level of respective material inside a plurality of vessels, comprising:

a plurality of transducers mounted in respective vessels at positions and orientations adapted to direct an ultrasound signal toward the surface of said material and receive reflections of said ultrasound signal from the surface of said material, said being adapted for optimum performance at a respective operating frequency;

a multiplexer having a plurality of first terminals connected respectively to said plurality of transducers, said multiplexer having a second terminal that is selectively coupled to each of said first terminals responsive to a multiplexer control signal;

an ultrasound transmitter coupled to the second terminal of said multiplexer, said ultrasound transmitter applying a transmit signal to said second terminal responsive to a trigger signal thereby causing said transducer to generate said ultrasound signal, said transmitter further including a variable frequency generator generating said transmit signal at a frequency corresponding to a frequency control signal;

an electronic receiver coupled to the second terminal of said multiplexer, said receiver generating a receive signal responsive to said reflections of said ultrasound signal from the surface of said material;

a signal detector coupled to said electronic receiver, said signal detector generating respective signal detect pulses responsive to detection of said receive signals; and a processor having respective outputs coupled to said transmitter and said multiplexer, and an input coupled to said signal detector, said processor generating said trigger signal and coupling said trigger signal to said transmitter to cause said transmitter to generate said transmit signal, said processor receiving at least one of said signal detect pulses from said signal detector to identify said ultrasound signal reflections, said processor further determining respective elapsed time intervals between said trigger signal and at least one signal detect pulse from a received echo and converting one elapsed time interval into a distance indication corresponding to the level of the surface of said material, said processor further generating said multiplexer control signal to cause said multiplexer to selectively connect the second terminal of said multiplexer to one of said first terminals of said multiplexer so that said transmitter selectively applies a transmit signal to one of said ultrasound transducers through said multiplexer to cause said transducer to generate an ultrasound signal and so that said electronic receiver generates a receive signal responsive to said reflections of said ultrasound signal from the surface of said material whereby said processor provides respective distance indications corresponding to the level of the surface of material in each of said vessels, and wherein said processor further includes a table recording the value of the respective operating frequency for each of said transducers, and wherein said processor generates said frequency control signal in synchronism with said multiplexer control signal in accordance with the operating frequencies recorded in said table so that said transmitter applies a transmit signal having the operating frequency of the transducer to which said transmitter is connected through said multiplexer.

24. The system of claim 23 wherein said electronic receiver further includes a programmable bandpass filter through which said receive signal is coupled, said programmable bandpass filter selectively passing a signal having a frequency designated by a bandpass frequency signal, and wherein said processor is coupled to said programmable bandpass filter to apply said bandpass filter to said filter in synchronism with said frequency control signal so that said bandpass filter is tuned to the frequency of said reflected transmit signal as said transmitter selectively applies transmit signals corresponding to the respective operating frequencies of the transducer to which said transmitter is connected.

25. An acoustic ranging system for monitoring the level of material inside a vessel, comprising:

a transducer mounted in said vessel at a position and orientation adapted to direct an ultrasound signal toward the surface of said material and receive reflections of said ultrasound signal from the surface of said material;

an ultrasound transmitter coupled to said transducer, said ultrasound transmitter applying a transmit signal to said transducer responsive to a trigger signal thereby causing said transducer to generate said ultrasound signal and an exponentially decaying ringdown signal immediately following said ultrasound signal;

an electronic receiver coupled to said transducer, said receiver generating a receive signal responsive to said ringdown signal and responsive to reflections of said ultrasound signal from the surface of said material;

a programmable gain amplifier having a gain determined by a gain control signal said programmable gain amplifier being coupled to said electronic receiver to generate an output signal having an amplitude corresponding to the product of the amplitude of said receive signal and the gain of said programmable gain amplifier;

a signal detector coupled to said programmable gain amplifier to receive the output of said amplifier, said signal detector generating respective signal detect pulses responsive to detection of said receive signals; and a processor having an input coupled to said signal detector and respective outputs coupled to said transmitter and to said programmable gain amplifier, said processor generating said trigger signal and coupling said trigger signal to said transmitter to cause said transmitter to generate said transmit signal, said processor further generating said gain control signal to control the gain of said amplifier, and wherein said processor periodically records the amplitude of receive signals corresponding to said ringdown signal to obtain a profile of the amplitude of said ringdown signal as a function of elapsed time from the termination of said transmit signal, generates a control signal to adjust the effective threshold of said signal detector as a function of said ringdown amplitude profile so that the effective threshold corresponds to the amplitude of said ringdown signal so that said signal detect pulses are generated responsive to receive signals from reflections of said ultrasound signal having amplitudes greater than the amplitude of said ringdown signal, determines respective elapsed time intervals between said trigger signal and each signal detect pulse, and converts one of said elapsed time intervals into a respective distance indication corresponding to the level of the surface of said material, said processor periodically recording the amplitude of receive signals corresponding to said ringdown signal at time intervals following the termination of said transmit signal corresponding to successive 2 inch increments in the distance beneath said transducer.

26. An acoustic ranging system for monitoring the level of material inside a vessel comprising:

a transducer mounted in said vessel at a position and orientation adapted to direct an ultrasound signal toward the surface of said material and receive reflections of said ultrasound signal from the surface of said material;

an ultrasound transmitter coupled to said transducer, said ultrasound transmitter applying a transmit signal to said transducer responsive to a trigger signal thereby causing said transducer to generate said ultrasound signal and an exponentially decaying ringdown signal immediately following said ultrasound signal;

an electronic receiver coupled to said transducer, said receiver generating a receive signal responsive to said ringdown signal and responsive to reflections of said ultrasound signal from the surface of said material;

a programmable gain amplifier having a gain determined by a gain control signal, said programmable gain amplifier being coupled to said electronic receiver to generate an output signal having an amplitude corresponding to the product of the amplitude of said receive signal and the gain of said programmable gain amplifier;

a signal detector coupled to said programmable gain amplifier to receive the output of said amplifier, said signal detector generating respective signal detect pulses responsive to detection of said receive signals; and a processor having an input coupled to said signal detector and respective outputs coupled to said transmitter and to said programmable gain amplifier, said processor generating said trigger signal and coupling said trigger signal to said transmitter to cause said transmitter to generate said transmit signal, said processor further generating said gain control signal to control the gain of said amplifier, and wherein said processor periodically records the amplitude of receive signals corresponding to said ringdown signal to obtain a profile of the amplitude of said ringdown signal as a function of elapsed time from the termination of said transmit signal, generates a control signal to adjust the effective threshold of said signal detector as a function of said ringdown amplitude profile so that the effective threshold corresponds to the amplitude of said ringdown signal so that said signal detect pulses are generated responsive to receive signals from reflections of said ultrasound signal having amplitudes greater than the amplitude of said ringdown signal, determines respective elapsed time intervals between said trigger signal and each signal detect pulse, and converts one of said elapsed time intervals into a respective distance indication corresponding to the level of the surface of said material, said processor determining respective elapsed time intervals between said trigger signal and signal detect pulses only if said reflections of said ultrasound signal have amplitudes greater than the amplitude of said ringdown signal by a predetermined value thereby making said system less sensitive to noise.

27. An acoustic ranging system for monitoring the level of material inside a vessel, comprising:

a transducer mounted in said vessel at a position and orientation adapted to direct an ultrasound signal toward the surface of said material and receive reflections of said ultrasound signal from the surface of said material;

an ultrasound transmitter coupled to said transducer, said ultrasound transmitter applying a transmit signal to said transducer responsive to a trigger signal thereby causing said transducer to generate said ultrasound signal;

an electronic receiver coupled to said transducer, said receiver generating a receive signal responsive to said reflections of said ultrasound signal from the surface of said material;

a signal detector coupled to said electronic receiver, said signal detector generating respective signal detect pulses responsive to detection of said receive signals; and a processor having an output coupled to said transmitter and an interrupt input coupled to receive said signal detect pulses from said signal detector, said processor generating said trigger signal and coupling said trigger signal to said transmitter to cause said transmitter to generate said transmit signal, said processor receiving at least one of said signal detect pulses from said signal detector to cause said processor to execute an interrupt routine to determine respective elapsed time intervals between said trigger signal and at least one signal detect pulse from a received echo and convert one elapsed time interval into a distance indication corresponding to the level of the surface of said material.

28. An acoustic ranging system for monitoring the level of material inside a vessel, comprising:

a transducer mounted in said vessel at a position and orientation adapted to direct an ultrasound signal toward the surface of said material and receive reflections of said ultrasound signal from the surface of said material;

an ultrasound transmitter coupled to said transducer, said ultrasound transmitter applying a transmit signal to said transducer responsive to a trigger signal thereby causing said transducer to generate said ultrasound signal and an exponentially decaying ringdown signal immediately following said ultrasound signal;

an electronic receiver coupled to said transducer, said receiver generating a receive signal responsive to said ringdown signal and responsive to reflections of said ultrasound signal from the surface of said material;

a programmable gain amplifier having a gain determined by a gain control signal, said programmable gain amplifier being coupled to said electronic receiver to generate an output signal having an amplitude corresponding to the product of the amplitude of said receive signal and the gain of said programmable gain amplifier;

a signal detector coupled to said programmable gain amplifier to receive the output of said amplifier, said signal detector generating respective signal detect pulses responsive to detection of said receive signals; and a processor having an interrupt input coupled to receive said detect pulses from said signal detector and respective outputs coupled to said transmitter and to said programmable gain amplifier, said processor generating said trigger signal and coupling said trigger signal to said transmitter to cause said transmitter to generate said transmit signal, said processor further generating said gain control signal to control the gain of said amplifier, and wherein said processor periodically records the amplitude of receive signals corresponding to said ringdown signal to obtain a profile of the amplitude of said ringdown signal as a function of elapsed time from the termination of said transmit signal, generates a control signal to adjust the effective threshold of said signal detector as a function of said ringdown amplitude profile so that the effective threshold corresponds to the amplitude of said ringdown signal so that said signal detect pulses are generated responsive to receive signals from reflections of said ultrasound signal having amplitudes greater than the amplitude of said ringdown signal, and executes an interrupt routine responsive to said signal detect pulse, said interrupt routing causing said processor to determine respective elapsed time intervals between said trigger signal and each signal detect pulse, and convert one of said elapsed time intervals into a respective distance indication corresponding to the level of the surface of said material, wherein said processor receives said signal detect pulse at an interrupt input, and whereby said processor executes an interrupt routine responsive to said signal detect pulse, said interrupt routine determining the elapsed time between said trigger signal and said interrupt.

* * * * *